No. 887,596. PATENTED MAY 12, 1908.
J. W. DAVIS.
HOEING CULTIVATOR.
APPLICATION FILED JUNE 29, 1907.
2 SHEETS—SHEET 1.
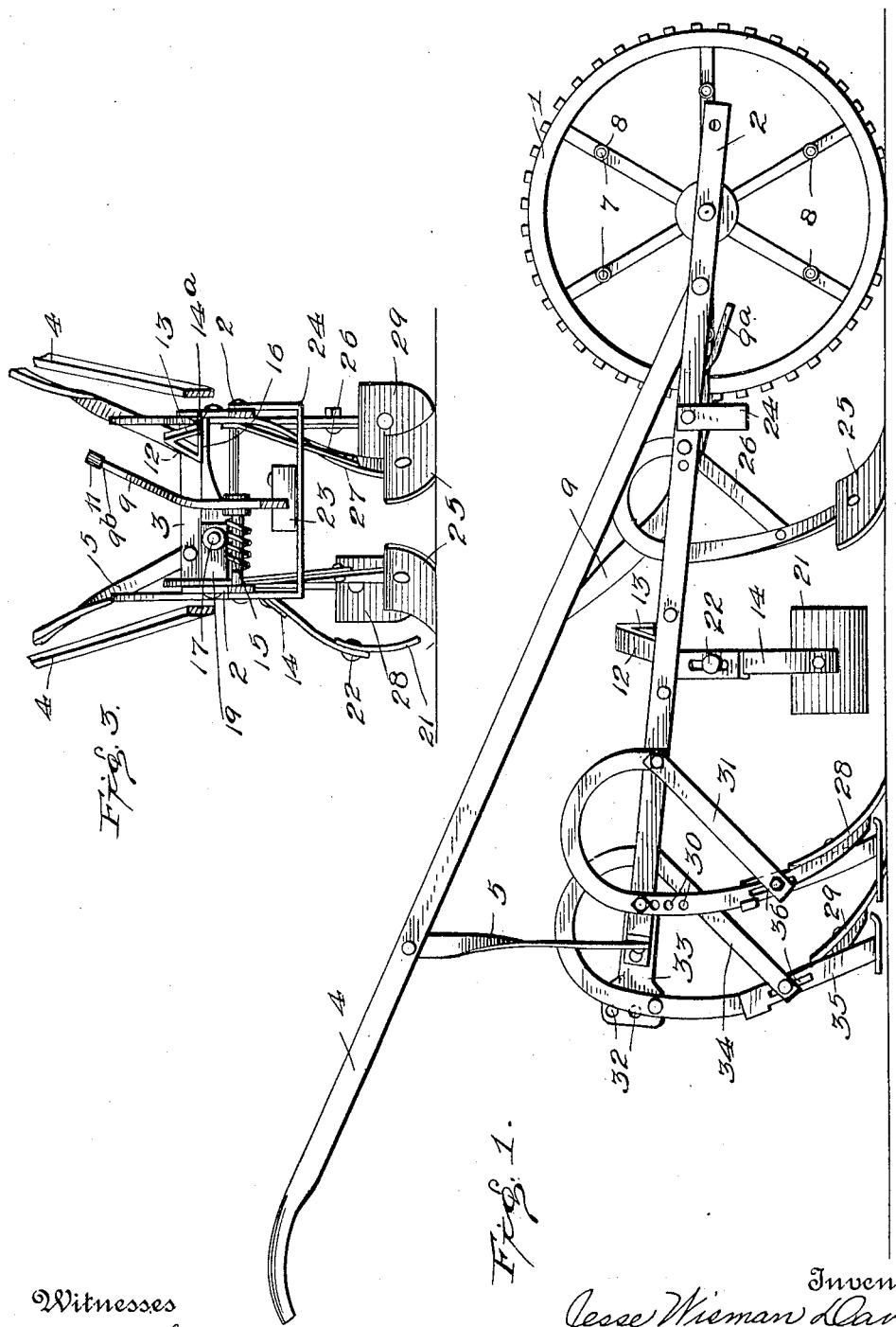
Witnesses
F. J. Veihmeyer
V. E. Burner
Inventor:
Jesse Wieman Davis,
by, Elson Bro's,
Attorneys No. 887,596. PATENTED MAY 12, 1908.
J. W. DAVIS.
HOEING CULTIVATOR.
APPLICATION FILED JUNE 29, 1907.
2 SHEETS—SHEET 2.
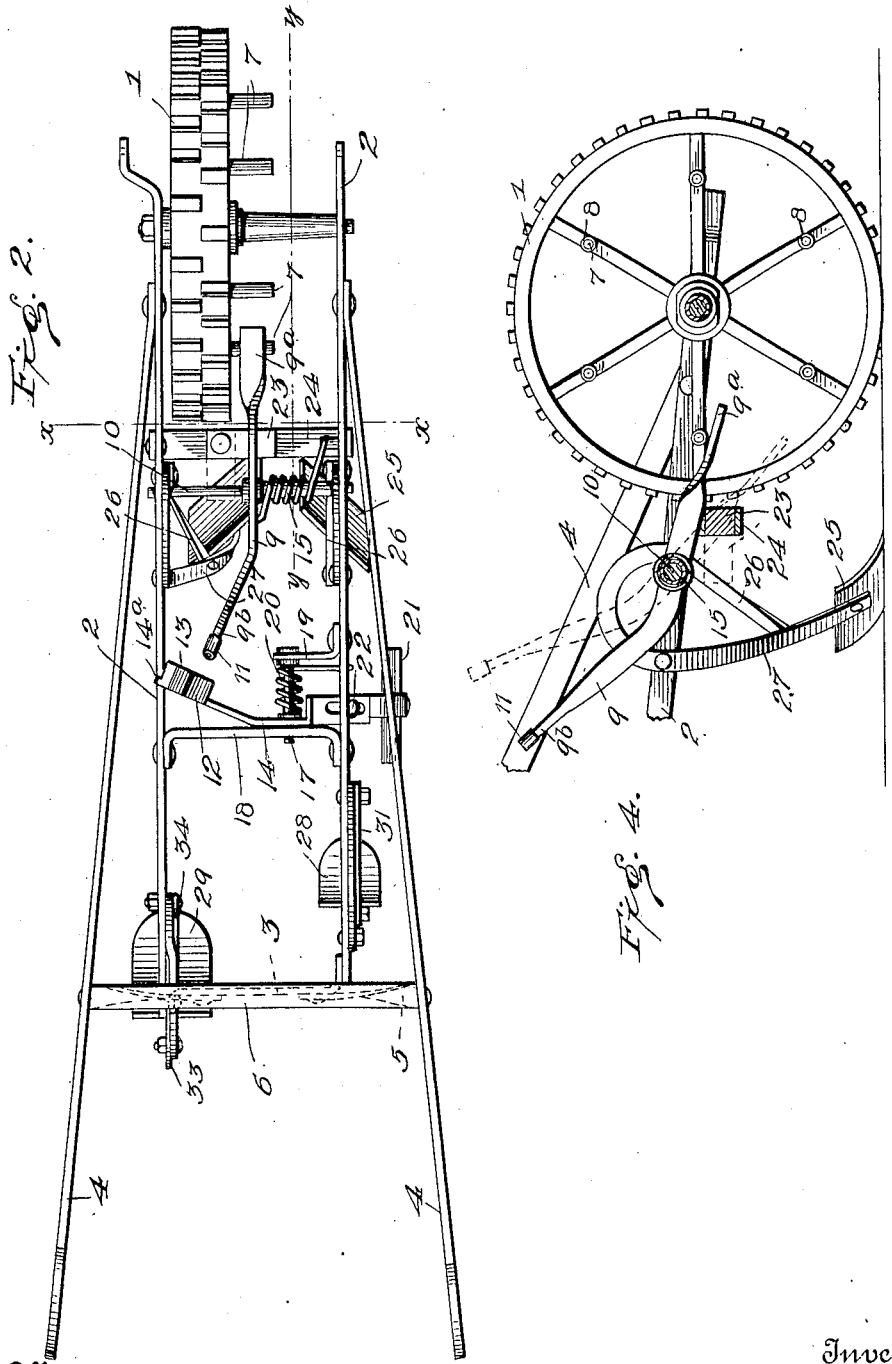
Witnesses
F. J. Veihmeyer
V. E. Burner
Inventor:
Jesse Wisman Davis
by Adam Bro's,
Attorneys.

UNITED STATES PATENT OFFICE.

JESSE WISMAN DAVIS, OF MIDDLETON, TENNESSEE.

HOEING-CULTIVATOR.

No. 887,596.

Specification of Letters Patent.

Patented May 12, 1908.

Application filed June 29, 1907. Serial No. 381,488.

*To all whom it may concern:*

Be it known that I, JESSE W. DAVIS, a citizen of the United States, residing at Middleton, in the county of Hardeman and State of Tennessee, have invented certain new and useful Improvements in Hoeing-Cultivators; and I do hereby declare the following to be a full, clear, and exact description of the invention, such as will enable others skilled in the art to which it appertains to make and use the same.

My invention is a combined cotton chopper and cultivator which may also be successfully used for cultivating broom corn, sorghum and many other small grains.

Its object is to provide a simple and practical machine for hoeing or chopping out portions of the row of plants at intervals and for working the sides of the row at the same time.

The invention consists broadly in the use of a laterally reciprocating hoe or chopper which is instantaneously moved across the row and withdrawn periodically as the machine moves along. Scrapers and plows are preferably mounted on the machine to work the sides of the rows.

The invention also consists in the features of construction and combinations of devices hereinafter described and specified in the claims.

In the accompanying drawings: Figure 1 is a side elevation of a machine or cultivator constructed in accordance with my invention. Fig. 2 is a plan view thereof. Fig. 3 is vertical cross-section on the line x—x of Fig. 2, and Fig. 4 is a broken longitudinal vertical section on the line y—y of Fig. 2.

The traction wheel 1 is mounted between horizontal side bars 2 connected by an end cross bar 3 and comprising the main frame of the machine. Inclined handle bars 4 are connected at their forward ends to said side bars and are supported near their rear ends upon a bent metal piece 5 secured to the rear end of the main frame and having a cross piece 6 which braces said handle bars apart. Said traction wheel carries a series of projecting pins 7 one preferably mounted on each spoke an equal distance from the hub. Each pin is provided with a roller bearing 8 for one end 9ª of the hoe or chopper actuating lever 9. Said lever is pivoted upon a shaft 10 extending between the side bars 2 and has sufficient lateral movement to allow the other end 9ᵇ thereof on which is mounted a roller bearing 11 to slide down the inclined face 12 of the trip 13 on the ends of the hoe carrying lever 14. Said lever 9 is pressed by a spring 15 having enough tension to throw said hoe-carrying lever 14 when the end 9ᵇ engages the under face 16 of the trip 13 and the end 9ª has escaped one of the pins 7 on the traction wheel. Said hoe carrying lever 14 is pivotally mounted on a shaft 17 arranged parallel to the side bars 2 and between a cross bar 18 and a bracket 19. Said lever is pressed by a spring 20 having just enough tension to withdraw or return the hoe 21 after each throw. The end 14ª of the lever 14 engaging one of the side bars 2 forms a stop on the return stroke of said lever. Said hoe is adjustable vertically to cut at different depths by means of the slot and bolt connection 22 with the lever 14.

The hoe actuating lever 9 is normally held in position so that its end 9ᵇ lies in the path of the pins on the traction wheel by means of block 23 pivoted on a cross bar 24. Said block may be turned from under said lever as shown in dotted lines in Figs. 2 and 4 and when so turned, the lever will drop upon the cross bar 24 where its end 9ᵇ will be out of the path of the pins on the traction wheel. The utility of having the lever 9 in this position while bringing the machine to the field or when it is desired to use said machine simply as a scraper and plow will be readily appreciated.

Two scrapers 25 are mounted on the forward part of the main frame, one being fastened to each of the side bars 2 and braced by a rod 26 from said side bars. It will be noted that one of said scrapers is bent inward at 27 to bring said scraper over toward the other side of the machine so that it will be out of line with the traction wheel. Said traction wheel, it will be observed, is mounted at one side of the main frame so that it will pass along at one side of the row being worked while the scrapers trim up each side of said row.

The plows 28 and 29 are adjustably secured to the rear ends of the side bars of the main frame. The plow 28 is adjustable by means of a series of holes 30 in the plow arm and is braced by a rod 31. The plow 29 is adjustable by means of a series of holes 32 in a plate 33 secured to the end of the side bar and is also braced by a rod 34. Each plow is fitted with a heel piece 35 which is adjustable by means of the bolt and slot connection 36 to hold the plows the proper depth in the ground.

The operation of the machine will be readily understood. When the lever 9 is raised upon the block 23, its end 9$^b$ will extend in the path of the pins 7 so that as the machine moves along, said lever will be actuated at regular intervals by said pins. The end 9$^a$ of said lever will in turn throw the hoe-carrying lever as described and said lever will be automatically withdrawn after each throw in readiness to be actuated again. It will be noted that each throw of the hoe is instantaneous as soon as the end 9$^b$ of the lever 9 escapes one of the pins 7 and that said hoe is instantly withdrawn as soon as the end 9$^a$ of said lever escapes the trip 13. It will thus be seen that the portions of the row removed by the hoe will be neatly cut straight across and not on an incline as would be the case if said hoe were operated by gears and moved across gradually as the machine proceeds forward. The scrapers and plows operate to work the side of the row in the usual manner.

I claim:

1. In a machine of the character described, the combination, with the main frame, of a traction wheel mounted thereon and carrying projecting pins, a laterally movable hoe mounted on a spring pressed lever provided with a trip, and another spring pressed lever, one end of which extends into the path of said pins and the other end of which is adapted to engage said trip.

2. In a machine of the character described, the combination, with the main frame, of a traction wheel mounted thereon and carrying projecting pins, a laterally movable hoe mounted on a spring pressed lever provided with a trip, another spring pressed lever, one end of which extends into the path of said pins and the other end of which is adapted to engage said trip, and means to drop said latter lever out of the path of said pins.

3. In a machine of the character described, the combination, with a laterally movable hoe mounted on a spring pressed lever provided with a trip at its end having an inclined face and a horizontal face of another spring pressed lever having one end adapted to pass down said inclined face of said trip and engage its horizontal face to throw said hoe, and means to operate said latter lever.

4. In a machine of the character described, the combination, with a laterally movable hoe mounted on a spring pressed lever provided with a trip at its end having an inclined face and a horizontal face, of another spring pressed lever having one end provided with a roller bearing adapted to pass down said inclined face of said trip and engage its horizontal face to throw said hoe, and means to operate said latter lever.

5. In a machine of the character described, the combination, with the main frame, of a traction wheel mounted thereon and carrying projecting pins with roller bearings, a laterally movable hoe mounted on a spring pressed lever provided with a trip, and another spring pressed lever, one end of which extends into the path of said pins and the other end of which is provided with a roller bearing adapted to engage said trip.

6. In a machine of the character described, the combination, with the main frame, of a traction wheel mounted thereon and carrying projecting pins, a laterally movable hoe mounted on a spring pressed lever provided with a trip at its end having an inclined face and a horizontal face, and another spring pressed lever having one end extending into the path of said pins and the other end adapted to pass down said inclined face of said trip as the other end is engaged by one of said pins, said trip-engaging end of said lever adapted to engage the horizontal face of said trip when the other end escapes the pin whereby said hoe is operated.

In testimony whereof, I affix my signature, in presence of two witnesses.

JESSE WISMAN DAVIS.

Witnesses:
 JESSE FRANK JENKINS,
 PERRY TILLMON.